Dec. 29, 1953 W. KRUMBACH 2,664,118

PULLEY MOUNTING FOR SAWING EQUIPMENT OF THE BAND-SAW TYPE

Filed Nov. 29, 1946 4 Sheets-Sheet 1

INVENTOR
WILL KRUMBACH
BY
Wheeler, Wheeler & Wheeler
ATTORNEY

PULLEY MOUNTING FOR SAWING EQUIPMENT OF THE BAND-SAW TYPE

Filed Nov. 29, 1946

4 Sheets-Sheet 2

INVENTOR
WILL KRUMBACH
BY
Wheeler, Wheeler & Wheeler
ATTORNEY

INVENTOR
WILL KRUMBACH
BY
Wheeler, Wheeler & Wheeler
ATTORNEY

Dec. 29, 1953 W. KRUMBACH 2,664,118

PULLEY MOUNTING FOR SAWING EQUIPMENT OF THE BAND-SAW TYPE

Filed Nov. 29, 1946 4 Sheets-Sheet 4

INVENTOR
WILL KRUMBACH
BY
Wheeler, Wheeler & Wheeler
ATTORNEY

Patented Dec. 29, 1953 2,664,118

UNITED STATES PATENT OFFICE 2,664,118

PULLEY MOUNTING FOR SAWING EQUIPMENT OF THE BANDSAW TYPE

Will Krumbach, Burlington, Wis.

Application November 29, 1946, Serial No. 712,977

2 Claims. (Cl. 143—31)

My invention relates to sawing equipment of the band saw type.

My primary object is to provide more efficient, durable, and safe band sawing equipment.

More specific objects are to provide an improved housing for the working parts—to provide unitary mountings for the upper and lower wheels which can be assembled as units preparatory to installation in the upper and lower housing members—to provide improved accessibility to the units for purposes of adjustment and repair—to provide resilient saw tensioning means which will not permit displacement of the saw with reference to the saw table or the saw supporting wheel—to provide snubbing means for limiting the movement of the upper wheel under spring pressure when tensioned blades become broken—to provide for spring tension on opposite sides of the center line of the tensioning means—to provide improved blade guiding, thrust receiving and guarding devices—to provide a tiltable work supporting table with an associated dust collecting hood—to provide accessible saw guiding means within said hood and to obtain maximum precision and convenience in operation.

The durability of a band saw is largely dependent upon the precision with which it is tensioned and guided, not only when it is being idly driven, but when it is subject to work thrust, strains and cramping effects.

Safety in the use of such equipment is largely dependent not only upon the extent to which the working parts are nomally housed, but upon the extent to which they are guarded under abnormal conditions, such as breakage or displacement of the saw.

Safety is also dependent upon convenience in manipulating the work, freedom of the atmosphere from dust, adjustability of guarding means, and the degree to which separate parts of the housing are made accessible without unnecessarily exposing other working parts.

My object is to meet these requirements to a greater extent than has heretofore been accomplished, and particularly to provide improved guarding means for the working portion of the saw blade which can be readily adjusted in accordance with the thickness and character of the work in association with saw guides, and thrust receiving devices capable of guiding the saw precisely without developing injurious friction, binding pressure, or heating tendencies.

In the following description, reference is had to the accompanying drawings, in which Figure 1 is a front elevation of my improved band saw, showing fragments of the upper and lower doors in open position.

Like parts are identified by the same reference characters throughout the several views.

Figures 1, 2, 3, 4:
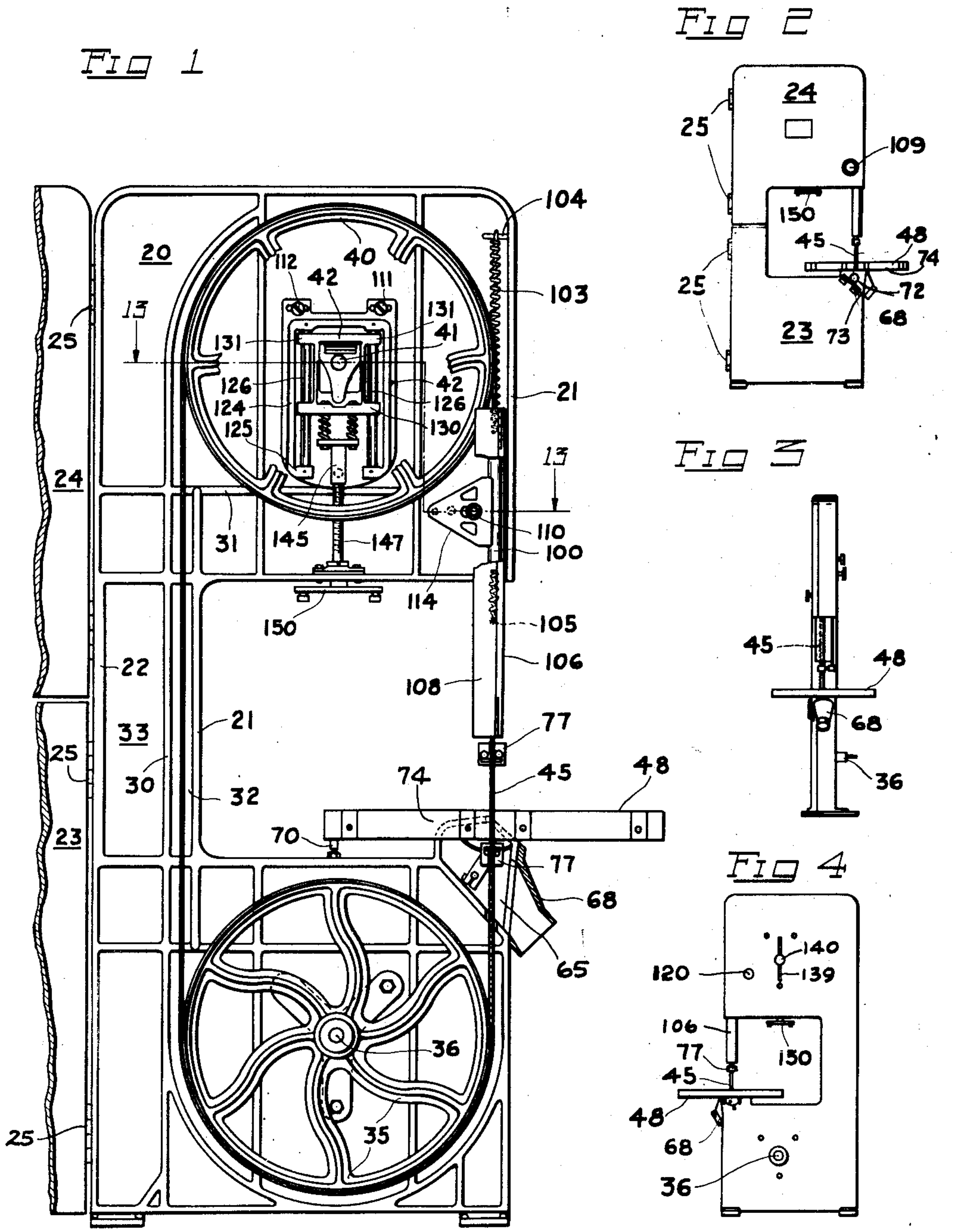
Figure 2 is a similar view on a reduced scale, showing the doors closed.
Figure 3 is a side elevation.
Figure 4 is a rear elevation.

My improved equipment is largely concealed within a narrow housing comprising a hollow standard having box-like lower and upper lateral projections which extend to the right in Figure 1. The housing is provided with a rear wall 20, relatively narrow side walls 21 and 22, and front wall members composed of doors 23 and 24 hinged to the standard at 25, whereby either extension may be opened and closed independently of the other. The rear wall 20 is provided with interior reenforcing ribs 30 and 31. The rib 30 preferably sub-divides the standard into vertically extending channels or passages 32 and 33. The ribs 31 are of less cross section and serve merely as horizontal and vertical reenforcements for the rear wall, thereby making this narrow housing extremely rigid in proportion to the weight of the material of which it is composed.

The lower box-like extension houses a pulley wheel 35, mounted on a driving shaft 36 supported in journal bearings at 37 (Fig. 8) and extending through the rear wall, to be connected with any suitable source of power (not shown). The upper box-like extension houses a pulley wheel 40 journaled on a stud shaft 41 carried by a mounting plate 42 adjustably connected with the rear wall as hereinafter explained.

An endless saw band 45 extends about the wheels 35 and 40 and is driven by the shaft 36 and the driving wheel 35, the upper wheel 40 running idle on its stud shaft.

Figures 10, 11, 12:
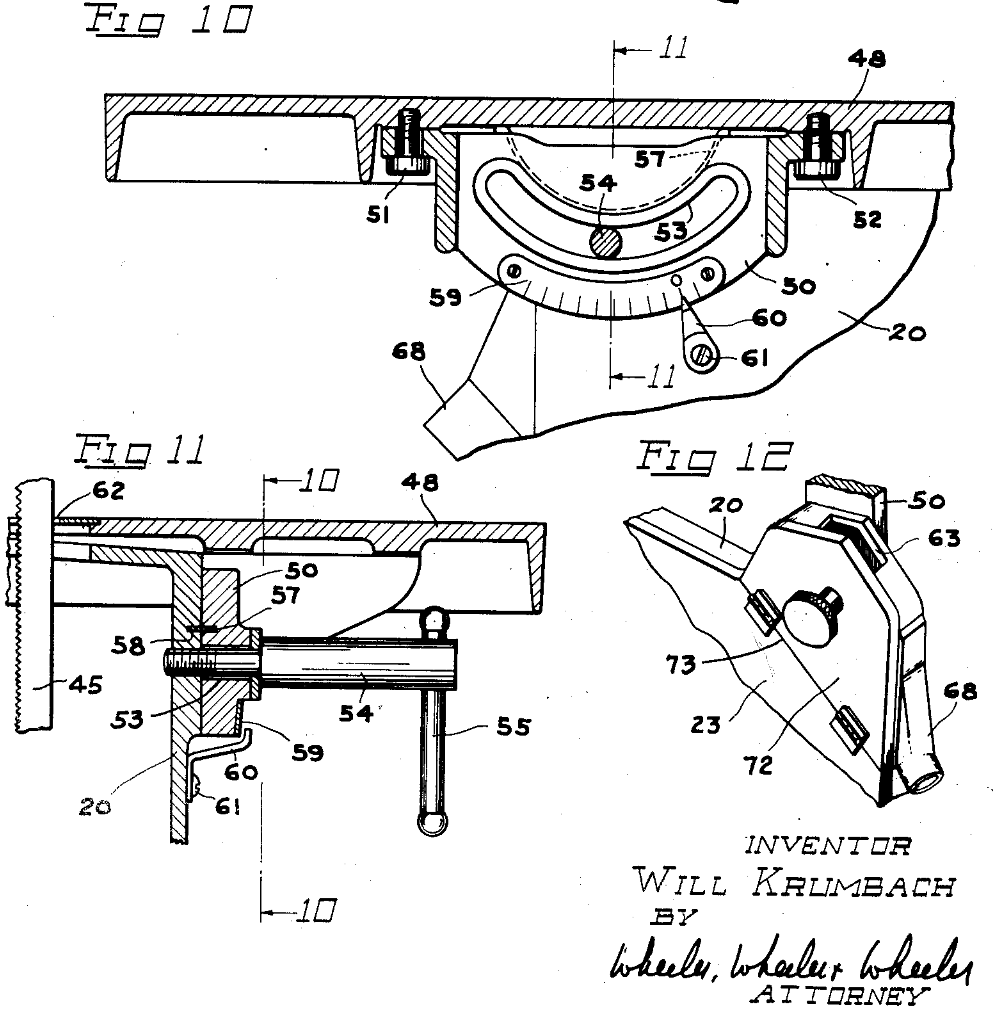
Figure 10 is a sectional view of the table, drawn to line 10—10 of Figure 11.
Figure 11 is a sectional view drawn to line 11—11 of Figure 10.
Figure 12 is a detail view of the dust collector door, showing also a fragment of the lower housing door to which it is hinged.

In the construction illustrated in Figure 1, the portion of the saw at the left may be assumed to move upwardly in the channel 32, and the channel 33 may be assumed to house tools, electrical switches, etc. The working portion of the saw band moves downwardly in the space between the upper and lower box-like extensions and through a slotted work supporting platform 48 supported from the rear face of the rear wall 20 by a clamping plate 50 connected with the under surface of the platform by brackets 51 and 52, best shown in Figures 10 and 11. The clamping plate 50 has an arcuate slot 53 through which a clamping bolt 54 extends, this bolt having an operating handle 55.

The plate 50 is provided with an arcuate rib 57 with which the slot 53 is concentric. The rib comprises a steel band which is pressed into an arcuate kerf in the plate 50 and more loosely fits in a corresponding groove or arcuate kerf 58 in the rear wall 20. This rib or band serves as a trunnion for the platform whereby it may be held with its upper surface either horizontal or in various laterally tilted positions. The clamping plate 50 has its lower marginal portion provided with an index as indicated at 59, and an associated pointer 60 is secured to the rear wall 20 at 61 to indicate the degree of tilting adjustment.

The work supporting platform is provided with an insert having a slot 62 (Fig. 9) through which the saw band passes downwardly into the lower housing extension and through openings 63 and 64 in the dust collecting hood 65 mounted within the upper corner of this housing member. The hood extends downwardly and laterally through an opening 67 for delivery of the dust into a chute 68 which conveys it to a suitable point of discharge.

Figure 9:
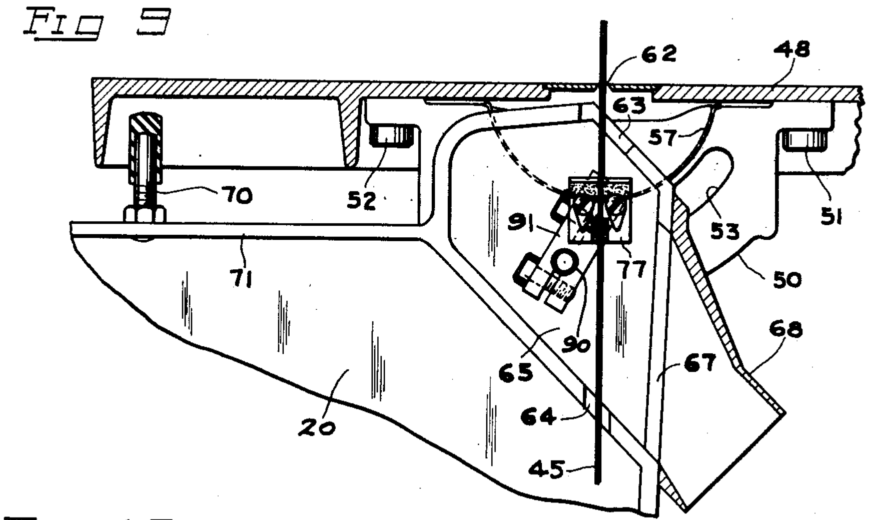
Figure 9 is a fragmentary sectional view of the work supporting table and dust collector, drawn to a plane exposing a fragment of the saw.

The platform 48 is adjustable in one direction a maximum of about 5° to a position of rest on a stop 70 carried by the wall 71 (Figure 9). The platform may be tilted a maximum of about 45° in the opposite direction. Except for its front wall, the dust collecting hood may be an integral part of the wall 20, but the front wall 72 of the hood is preferably hinged to the margin of an opening or notch 73 in the door 23 (see Fig. 12). Therefore this wall 72 may be swung downwardly to expose the interior of the hood and clear the front marginal flange 74 of the platform preparatory to opening the door 23.

Figure 14:
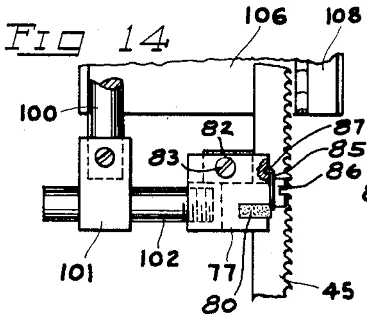
Figure 14 is a side elevation of the guide, showing a fragment of the saw.
Figure 15:
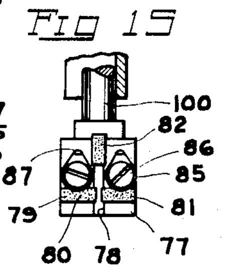
Figure 15 is a front elevation of the same.
Figure 16:
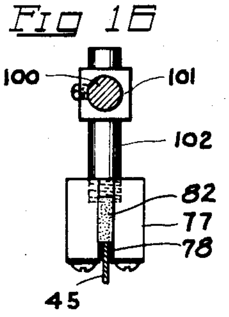
Figure 16 is a perspective view of the same, with the block holders removed.

Within the dust collecting hood 65, and also above the slotted insert of the work supporting platform, I provide an improved assembly for precisely guiding the saw blade, and resisting its reactionary thrust. Each of these assemblies comprises a holder 77 (Figures 14, 15 and 16), cross channeled in three directions to provide in its front face a vertically extending open slot or runway 78 to receive the downwardly moving saw blade adjacent to its working portion. The cross channel 79 in the front face of the holder receives a pair of guide blocks 80 and 81, one at each side of the runway, and a rearwardly extending channel in one of the horizontal faces of the holder and in the vertical plane of the runway receives a thrust bearing block 82 adjustably positioned in the channel and secured by a set screw 83. The blocks 80 and 81 are adjusted in the cross channel 79 and held in running fit relation to the saw blade by washer-like members 85 secured to the holder by set screws 86, with one margin of each overlapping its associated guide block and another margin provided with a pointed lip 87 adapted to be forced into the holder by the set screw. Each of the members 85 is thus locked against rotation.

Each of these blocks is composed of tungsten carbide steel, preferably with a tantalum alloy. I have found that by employing guide blocks of a diamond-like hardness and a contacting surface of glass-like smoothness, and by adjusting each block separately in its proper relation to the saw, these band saws may be guided for prolonged periods without showing wear and without causing the saw to vibrate as it does when guiding rollers or other prior art guides are used. Such smooth surfaces are these that the saw travels over them substantially without friction. I find that these blocks are capable of performing their functions indefinitely without becoming scored and without heating, or binding the saw, or in any way impairing its efficiency.

Figure 18:
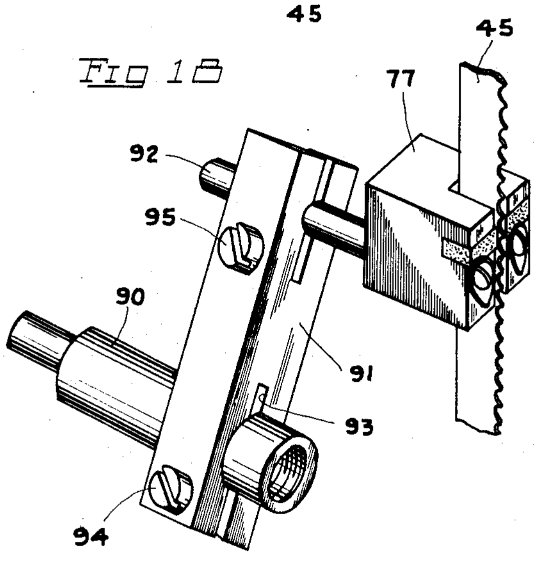
Figure 18 is a detail view of the lower guide assembly and its supporting parts.

The lower holder 77 is located in the dust collecting chamber 65 and adjustably supported from the rear wall thereof by a stud 90, forked bar 91, and rod 92, one end of which is threaded into the holder 77, as best shown in Figure 18. The bar 91 is apertured to receive the stud 90 and the apertured portion is longitudinally split as indicated at 93 to provide fork arms which can be clamped to the stud in various positions of adjustment by a clamping screw 94. The other end of the arm 91 is similarly forked and clamped to the rod 92 by the clamping screw 95. Therefore the lower guide block holder 77 is capable of various swinging and rocking adjustments.

Access to this guiding assembly may be obtained by opening small door 72, or, if more working access is desired, by opening door 23.

The holder 77 of the upper saw guiding assembly is exactly like the one in the dust collecting hood, but it is reversed in position, the thrust block 82 being supported above the guide blocks 80 and 81. As best shown in Figures 13 to 16, inclusive, this upper holder is supported from the upper box-like extension of the housing by a hanger rod 100 having a fitting 101 secured to its lower end and provided with a rod-like arm 102 on which the associated holder 77 is mounted in the manner above described with reference to the rod 92 which supports the lower holder 77 in the dust hood.

Figure 13:
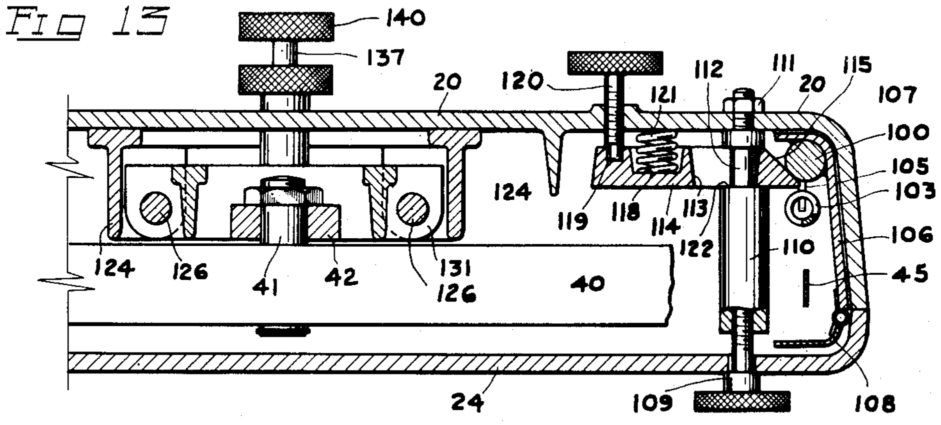
Figure 13 is a horizontal section of a portion of the upper housing, drawn to line 13—13 of Figure 1.
Figure 17:
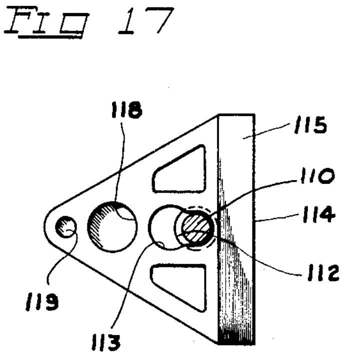
Figure 17 is a detail view of the guide supporting clamp.

A helically coiled tension spring 103 connects the hanger rod with the upper portion of the upper housing extension. The upper end of the spring is secured to an inwardly projecting pin 104 (Fig. 1), and its lower end is connected with the hanger rod by a pin 105. A guard plate 106 is welded, riveted or otherwise permanently secured to the hanger rod and conforms to the inner surface contour of the side wall of the upper housing extension and the rounded elbow 107 which connects the side wall with the back wall 20. A hinged extension 108 of the guard normally extends in front of the downwardly moving portion of the saw band 45 and is held in this position by the door 24. The latter carries a locking screw 109, threaded for engagement with the end of a stud 110 having a reduced end secured to the back wall by a nut 111. This stud also has a reduced neck portion 112 which passes through a keyhole slot 113 (Fig. 17) in a clamping plate 114, one end of which has a wide beveled margin 115 adapted for clamping engagement with the hanger 100, as best shown in Figure 13.

The end portion of this clamping plate distant from its beveled margin is provided with a spring receiving socket 118 and a socket 119 to receive a clamp actuating screw 120 threaded in a back wall aperture and provided with an exterior operating knob. A compression spring 121 is interposed between the back wall 20 and the clamping plate with one end portion engaged in the socket 118. The spring 121 urges the beveled surface 115 against the hanger 100 with sufficient pressure to hold it in position while the parts are at rest, since the weight of the hanger and guard is nearly counterbalanced by the spring 103. But when the hanger has been adjusted at a desired elevation, the clamping screw 120 may be actuated to rock the plate 114 on the stud shoulder 122 as a fulcrum and thus apply additional pressure to the hanger and guard plate 106, whereby they may be securely held in such position.

The above described supporting and clamping assembly, with the hanger 100 and guard plate 106, facilitates accurate adjustments of these parts with reference to the thickness of any given piece of work. It is important that the upper guide holder 77 shall be as close to the work as possible, and that the guard 106 shall at all times cover substantially all portions of the saw which would otherwise endanger the workmen. The cooperative action of the counterbalancing spring 103 and clamping spring 121 enables the operator to readily accomplish a precise adjustment of the hanger and guard from the front of the machine while the door 24 is open and all parts visible. Thereupon the operator passes to the rear side of the machine, turns the clamping screw 120 to clamping position, and starts the motor before returning to the front of the machine to manipulate the work in contact with the saw.

The manner in which the upper pulley wheel 40 and its stud shaft 41 are supported from the mounting plate 42 will now be described. The upper pulley wheel is not only movable toward and away from the lower one to regulate the tension of the saw blade, but means are provided for tilting it to regulate the position of the saw blade on the pulley rim and prevent the work from pulling the blade from the pulley when the work is being withdrawn from the saw. Therefore slide means are employed for tensioning the saw and the shaft is tilted to regulate its position on the pulley rim.

Figure 5:
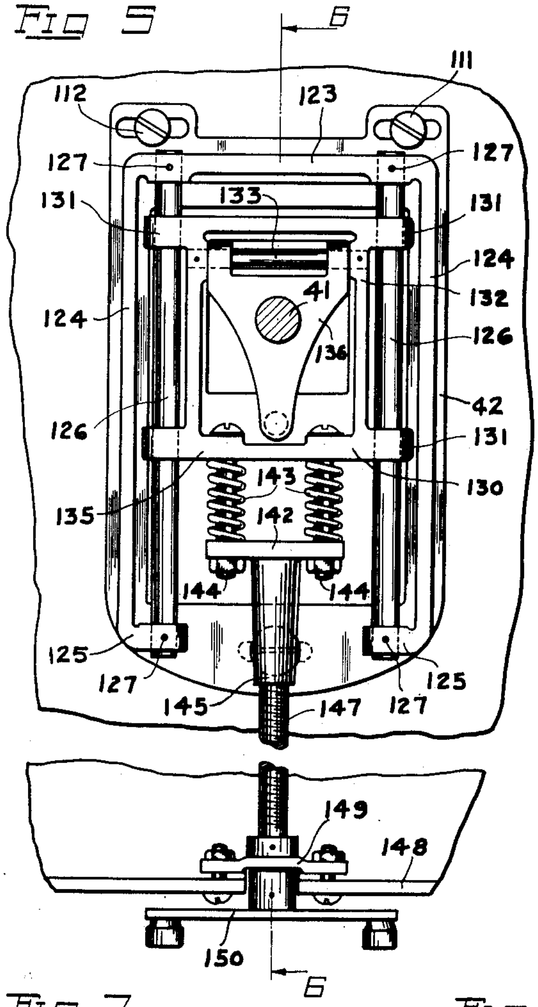
Figure 5 is a front elevation of the tension adjusting and tilting unit mounted on a fragment of the housing back wall.
Figure 6:
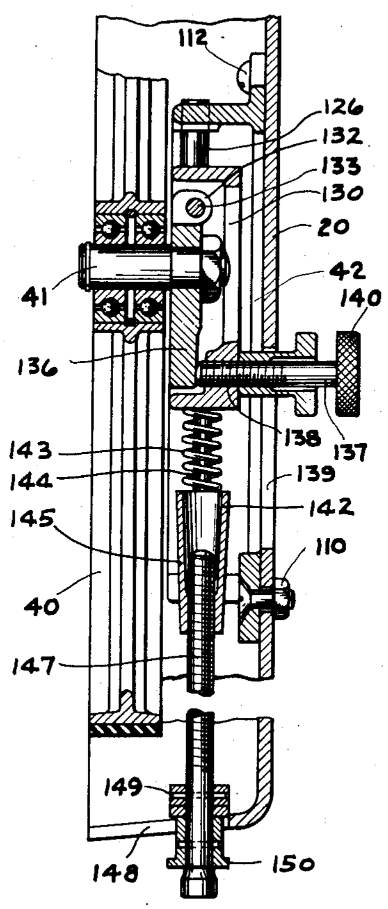
Figure 6 is an edge view of said unit, a portion of the housing being shown in section.

For these purposes the mounting plate 42 is provided with an upper horizontal rib 123 and side ribs 124 having elbowed lower ends 125 (see Figs. 5 and 6). Guide rods 126 extend through apertures in the rib 123 and the elbowed portions 125 of the side ribs, and are secured thereto by pins or rivets 127. A skeletonized slide 130 has apertured laterally projecting arms 131 through which the rods 126 pass.

The slide has side portions 132, to the upper ends of which a pivot pin 133 is secured. The stud shaft 41 upon which the upper pulley wheel 40 is journaled has its rear end rigidly secured to a bracket 136 pivotally supported from the slide by the pin 133. When the hanger bracket is in a vertical plane, the stud shaft 41 will be supported in a horizontal position, but it may be tilted to regulate the running of the saw blade over the pulley by swinging the lower end of the bracket forwardly. This adjustment may be manually made by means of an adjusting screw 137, threaded into the slide at 138, with its inner end bearing against the lower end portion of the bracket 136. The screw 137 extends through a slot 139 in the rear wall of the housing and is provided with an exterior operating knob 140, whereby the bracket 136 may be adjusted and readjusted in various positions of slide elevation.

The lower portion 135 of the slide is supported from a cross head 142 by springs 143 through which snubber bolts 144 are passed to loosely connect the cross head with the slide and limit the distance of the member 135 from the cross head. The cross head has a depending shank 145 into the lower end of which another adjusting screw 147 is threaded, this adjusting screw being swiveled to the lower wall 148 of the housing extension at 149, and provided with operating cranks 150 in the space between the upper and lower housing extensions (see Fig. 1). When the screw 147 is turned in one direction the cross head 142 will be lifted and the slide 130 will be raised by the springs 143 to tension the saw band by yieldingly raising the upper pulley wheel. The degree of tension will be primarily determined by the springs, and by employing two springs on opposite sides of the center line of the slide and equidistant from a vertical plane through the axis of a stud shaft 41 the upward pressure on the slide will be balanced and cramping of the slide on the guide rods 126 will be avoided.

Figures 7, 8:
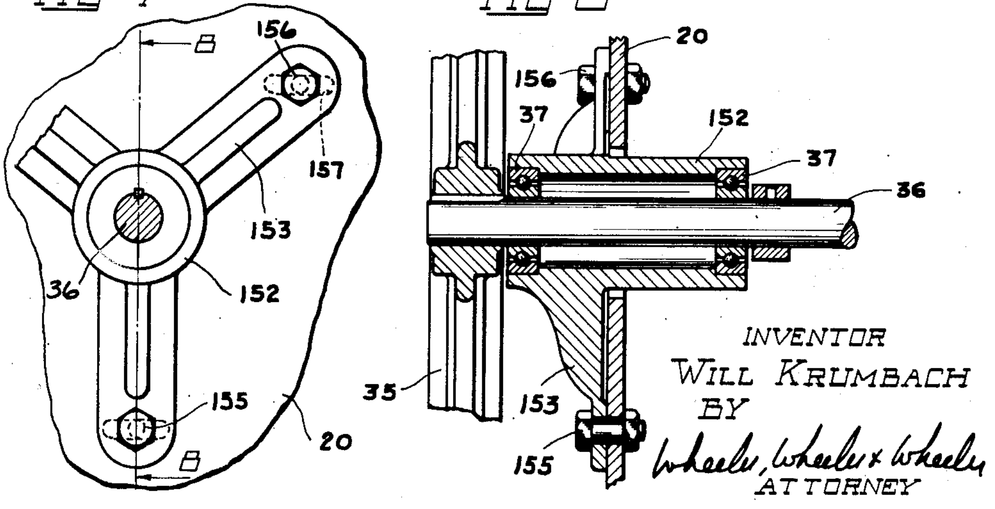
Figure 7 is a detail view of the three-point bearing for the drive shaft and lower pulley wheel, with one arm partially broken away.
Figure 8 is a sectional view of the same, drawn to line 8—8 of Figure 7.

As shown in Figures 7 and 8, the driving shaft 36 is mounted in a bearing sleeve 152 carried by a mounting plate 153 which has three points of contact with the back wall 20 to which it is secured by a lower pivot bolt 155 in a plane which includes the axis of the shaft 36. The other two bearing portions of the mounting plate 153 are secured to the rear wall by clamping bolts 156 which pass through oval apertures 157 in the back wall, whereby this mounting plate, as well as the mounting plate 42, may each have a slight rocking adjustment on its lower pivot bolt to accurately position the working portion of the band saw in the platform slot 62.

These various adjustments of the pulley wheel supports enable me to avoid any tendency for the saw band to slip away from its pulleys and to so precisely position the saw in the slot 62 as to substantially relieve the guide and thrust blocks mounted in the holders 77 from any pressure of the saw upon them other than that exerted by the work itself.

The upper holder will, of course, be adjusted in correspondence with the thickness of the work so that its guide blocks will be held in close proximity to the work at all times, and the guard 106 with its auxiliary wing 108, will therefore be effective to protect the workmen from contact with the saw.

I claim:

1. The combination with a band saw housing having a hollow standard and lower and upper wheel housing extensions, of a driving wheel mounted upon a shaft carried by an adjustable bearing plate in the lower extension, a supporting and tensioning wheel mounted in the upper extension, an endless saw band carried by said wheels with its downwardly moving portion exposed between said extensions, a mounting plate having a three-point connection with the upper housing extension and adapted to be clamped thereto in various positions of rocking adjustment, a slide vertically adjustable on the mounting plate, a bracket pivotally connected with the slide for swinging movement in a plane normal thereto, and a stud shaft carried by the bracket and upon which the upper wheel is journaled.

2. The combination set forth in claim 1, in which the lower wheel is fixedly connected with a driving shaft having bearings carried by a mounting plate secured to the rear wall of the housing and adapted for rocking adjustment with reference thereto, both the upper and lower mounting plates having at least three bolt receiving apertures, two of which are slightly larger than the clamping bolts which connect the plates with the wall of the housing, whereby when the bolts are loosened the plates may be rocked upon the third bolt to precisely position the working portion of the saw with reference to the slot in the work supporting platform.

WILL KRUMBACH.

References Cited in the file of this patent

UNITED STATES PATENTS

| Number | Name | Date |
|---|---|---|
| 120,949 | Doane et al. | Nov. 14, 1871 |
| 165,523 | Young et al. | July 13, 1875 |
| 170,814 | Carey | Dec. 7, 1875 |
| 201,498 | Clark | Mar. 19, 1878 |
| 373,031 | Thomas | Nov. 8, 1887 |
| 432,683 | Wilkin | July 22, 1890 |
| 502,887 | Griffin | Aug. 8, 1893 |
| 884,020 | Ihle | Apr. 7, 1908 |
| 1,038,328 | Ensign | Sept. 10, 1912 |
| 1,059,400 | Seberg | Apr. 22, 1913 |
| 1,380,707 | Fehrm | June 7, 1921 |
| 1,392,990 | Vaughan | Oct. 11, 1921 |
| 1,427,661 | Walker | Aug. 29, 1922 |
| 1,499,124 | Reichmann | June 24, 1924 |
| 1,552,665 | Authenrieth | Sept. 8, 1925 |
| 1,567,911 | Campbell | Dec. 29, 1925 |
| 1,789,569 | Tannewitz | Jan. 20, 1931 |
| 1,841,939 | De Koning et al. | Jan. 19, 1932 |
| 1,967,724 | Ponton | July 24, 1934 |
| 2,040,718 | Tautz | May 12, 1936 |
| 2,274,923 | Hedgpeth | Mar. 3, 1942 |
| 2,347,765 | Boice et al. | May 2, 1944 |
| 2,371,731 | Boice et al. | Mar. 20, 1945 |
| 2,380,700 | Lasar | July 31, 1945 |
| 2,384,364 | Boice et al. | Sept. 4, 1945 |
| 2,492,824 | Ahrndt et al. | Dec. 27, 1949 |

FOREIGN PATENTS

| Number | Country | Date |
|---|---|---|
| 1,758 | Great Britain | June 7, 1869 |
| 374,368 | France | Apr. 16, 1907 |